United States Patent [19]

Gueret

[11] Patent Number: 4,461,312

[45] Date of Patent: Jul. 24, 1984

[54] EYELASH BRUSH AND METHOD AND APPARATUS FOR MANUFACTURING SAME

[75] Inventor: Jean-Louis H. Gueret, Paris, France

[73] Assignee: L'Oreal, Paris, France

[21] Appl. No.: 373,172

[22] Filed: Apr. 29, 1982

[30] Foreign Application Priority Data

May 18, 1981 [FR] France ............................. 81 09851

[51] Int. Cl.³ ............................................. A45D 2/12
[52] U.S. Cl. ................................... 132/88.7; 132/159; 132/160
[58] Field of Search ............ 132/88.7, 11 A, 159–161, 132/40, 120, 126, 141, 142; 15/186–188, 159 A

[56] References Cited

U.S. PATENT DOCUMENTS

| 1,946,283 | 2/1934 | Hoffman | 15/188 |
| 2,859,478 | 11/1958 | Glasson | 18/42 |
| 3,214,777 | 11/1965 | Kutik | 15/187 |
| 3,312,583 | 4/1967 | Rochlis | 161/62 |
| 3,343,551 | 9/1967 | Anderson | 132/88.7 |
| 3,762,000 | 10/1973 | Menzin | 24/204 |

FOREIGN PATENT DOCUMENTS

| 1253668 | 11/1967 | Fed. Rep. of Germany. |
| 2559273 | 7/1977 | Fed. Rep. of Germany. |
| 1543108 | 9/1968 | France. |
| 1555983 | 12/1968 | France. |
| 2195319 | 3/1974 | France. |
| 2215184 | 8/1974 | France. |
| 2440171 | 5/1980 | France. |

Primary Examiner—C. Fred Rosenbaum
Assistant Examiner—Sherri E. Vinyard
Attorney, Agent, or Firm—Cushman, Darby & Cushman

[57] ABSTRACT

A make-up brush comprises an injection moulded frusto-conical support having integral bristles with enlarged ends. The bristles in certain rows have hooked ends directed towards an extension of the support (to engage a handle) and the bristles in other rows have hooked ends directed away from the extension.

The brush support is moulded using a segmented cavity die which has recesses defining the integral bristles.

1 Claim, 9 Drawing Figures

EYELASH BRUSH AND METHOD AND APPARATUS FOR MANUFACTURING SAME

The present invention concerns a make-up brush intended more particularly for the making up of eyelashes such as, for instance, a mascara brush. It also concerns a method and apparatus for manufacturing such a brush.

The usual brushes of this type most frequently comprise relatively long tufts of bristle arranged in rings or a helix around a mounting or handle formed by twisted iron wire. These brushes have many drawbacks. First of all, they can be relatively dangerous by reason of the presence of a sharp and rigid element such as iron wire which is capable of injuring the eyes. Then they achieve an unsatisfactory distribution of the make-up product on the eyelashes; in practice, the product is found to be deposited in heaps without any homogeneity thus making it a difficult and lengthy process for the user to obtain a suitable covering of the eyelashes by the make-up product.

These drawbacks derive particularly from the fact that these brushes comprise a considerable number of bristles which entangle the eyelashes, and cause defects in the distribution of the product. Moreover, the bristles have a hardness which is generally unsuitable for the lashes. Furthermore, the bristles have an inclination in relation to the axis of the supporting handle which does not either facilitate a perfect brushing of the eyelashes.

More recently, new mascara brushes have been proposed which comprise relatively short and rigid bristles arranged in longitudinal rows extending along and arranged around the brush handle. On a brush of this kind the bristles are formed by the closed loops of a strip of fabric rolled in the shape of a cone or cylinder around the handle. The material used is known under the trade name "VELCRO". These brushes have considerable advantages in comparison with the previous brushes in which the bristles were held in twisted iron wires because a better separation of the eyelashes and a more homogeneous covering are obtained. Nevertheless, the arrangement of the bristles on the strip of fabric is strictly dependent on the manufacturing process of this material and one therefore does not obtain an optimum conformation ensuring both the positioning of the product on the bristles and a wiping off or removal of the excess product from the bristles.

The present invention proposes to overcome these drawbacks and to supply an improved eyelash brush allowing a better separation of the individual eyelashes to be obtained, and a homogeneous layer of a make-up product or another product to be applied on the bristles whilst removing any excess product therefrom.

It is another object of the invention to provide a brush whose individual conformation of the bristles as well as their suppleness characteristics may be adapted so as to obtain an optimum application of the cosmetic product on the eyelashes in the shortest possible time.

Yet another object of the invention is to supply a method and a device allowing such eyelash brushes to be manufactured particularly cheaply and with a relatively low investment in materials whilst allowing the manufacture of brushes having different characteristics, particularly as regards shape and suppleness.

Accordingly, a first aspect of the present invention provides a make-up brush having a moulded support provided with a plurality of individual internal bristles thereon, said bristles being individually distributed in a regular manner on the said support so that the spacing between two axially consecutive bristles is such that, in use of the brush to brush a plurality of fibrous elements, the individual fibrous elements being brushed are separated by means of the bristles, and at least some of said bristles having enlarged ends.

It will thus be understood that the bristles may have the required degree of suppleness simply by the choice of the composition moulded to form the bristles and the support. The suppleness of the support can also be regulated by a suitable choice of both the hardness of the composition and the cross-section of the support.

Advantageously the bristles can have extremely varied shapes, which shape can be the same for all the bristles of the brush. On the contrary, the brush may have bristles of differing shapes arranged, for instance, in an alternating way, the bristles being of small thickness, in particular of the order of 1 to 2 tenths of a millimeter.

Preferably, the ends of the bristles which extend from the mounting in the manner of barbs have a free end with an enlarged shape, for instance formed as a hook, a ball, a Y, a T, or an umbrella or mushroom shape, which makes it possible on the one hand to increase the quantity of the cosmetic product retained by capillarity on each bristle and on the other hand to avoid the risk of damage to the eyes, particularly in the case where a material having a rather considerable hardness is chosen.

Like the support, the bristles can be made of any suitable material such as, for instance, polyurethane, polyvinyl chloride, polyethylene, or any other elastomeric material.

The bristles can be distributed in the form of rows regularly arranged on the elongated support, as substantially circular sets forming within themselves annular, parallel and equidistant free passages for the eyelashes or other fibrous elements to be brushed, the distance (in the direction of the longitudinal axis of the support) between the bristles of two contiguous series being of the order of 2 to 10 tenths of a millimeter. Each set may comprise bristles which are hook-shaped at their ends with certain of the bristles slightly offset axially from other bristles, the bristle hooks being axially orientated towards each other and each bristle having a planar side.

By virtue of the disposition of the bristles it is thus possible to obtain a perfect separation of each eyelash from the others, as each individual eyelash can be taken up in a passage formed between two axially interspaced bristles. Since, moreover, the make-up product to be applied is arranged regularly and homogeneously on the bristles, particularly by means of capillarity, it will be understood that it is in practice possible to obtain, in one single stage, a regular and homogeneous application of the product on each individual lash, and this more especially since the sweeping of the eyelash by the bristle allows the bristle to exercise also a wiping off function of the excess product deposited on the eyelash.

A second aspect of the invention also provides a method of manufacturing a make-up brush according to the first aspect of the invention, comprising injection moulding the support and its integrally formed regularly disposed bristles which extend from the support.

Advantageously the injection is carried out in a segmented cavity mould comprising a multiplicity of mould segments which are capable of radial displacement in relation to the mould cavity and stripping of the moulded support from the mould is effected by radially outward removal of said mould segments. Thus the mould sections retreat from and come nearer to the centre of the mould, that is to say the longitudinal axis of the part of the cavity which defines the support. It is thus possible to effect a radial stripping of each one of the parts.

The enlarged shape at the free ends of the bristles makes it possible to machine the part of the cavity which is to form the bristle as a recess in a radial side of a mould segment. When the various mould segments are assembled, this part (ie the recess) of the cavity is covered by the adjacent radial side of the adjacent mould segment.

However, as an alternative, the two adjacent sides of two contiguous mould segments may each comprise a recess defining one half of the bristle cavity portion, these two halves,i.e. recesses,of the cavity being superimposed when the mould is closed. However, this makes it necessary to obtain a higher degree of accuracy in the positioning and construction of the mould segments.

A third aspect of the invention provides apparatus for carrying out the method of the second aspect, such apparatus comprising a mould defining an enlongate cavity intended to form the support of the brush, said cavity being defined by a plurality of sector-shaped mould segments having radial side faces which come into contact when the mould is closed, the said segments being capable of motion with a radial component between a mould closed position and a mould open position.

In a particularly preferred form of the apparatus, the recesses forming the bristles are machined in the said radial surfaces of the mould segments so that one part of the bristle cavity machined in one of the surfaces is covered by the adjacent side of the contiguous mould segment.

In order that the present invention may more readily be understood the following description is given, merely by way of a non-restrictive example, with reference to the accompanying drawings in which.

Figure 1:
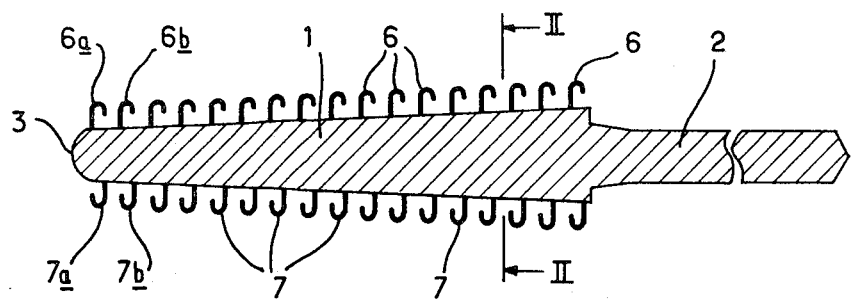
FIG. 1 shows a longitudinal cross section of a brush support and bristles, according to the invention, taken along the line I—I of FIG. 2.
Figure 2:
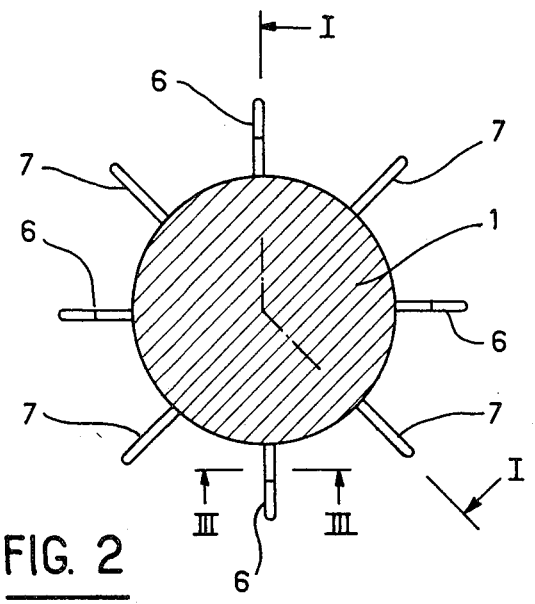
FIG. 2 is a transverse cross section of this support taken along line II—II of FIG. 1.
Figure 3:
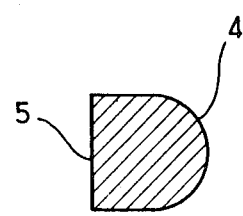
FIG. 3 is an enlarged cross section of a bristle taken along line III—III of FIG. 2.

Reference will firstly be made to FIGS. 1 to 3.

In FIG. 1 there will be seen a cross section, taken along line I—I of FIG. 2, of one end of an eyelash brush obtained by injection moulding of an elastomer. The bristle support 1 has a generally frustoconical shape of shallow taper having at its larger end a diameter of 4.5 mm and at its smaller end a diameter of 2.5 mm, the length of this frustoconical section being of the order of 25 mm.

The larger end of the cone trunk merges with a 12 mm long extension 2 having a diameter of the order of 3 mm. This extension 2 is intended to be inserted in the end of a hollow handle (not shown) intended to complete the brush according to the invention.

It will be seen that at the smaller end the frustoconical shape forming the support has a rounded or domed shape 3, to avoid injuries.

A number of bristles extend radially from the surface of the support 1. These bristles designated 6, 7 are arranged, as will be seen by referring in particular to FIG. 2, in eight longitudinal rows which are interspaced at regular angular intervals all round the support 1, one row of bristles 6 alternating with a row of bristles 7, the spacing between the adjacent bristles in a given row being 1.5 mm.

The various individual bristles 6, 7 have a hook-shaped end. The width of a hook end is 0.4 mm in the axial direction of the support. The cross section of the hook is shown in FIG. 3 and it will be seen that each hook has a rounded half section 4, having a radius of 0.1 mm, joined to a rectangular shape with a planar side 5. The whole cross-section is inscribed with a square having 0.2 mm sides. The height of the bristles is preferably 1.2 mm.

Referring to FIG. 2 it will, moreover, be seen that two successive bristle rows 6, 7 have their hooks orientated in opposite directions. Thus, the row of bristles 6 shown at the top of the drawing has its hooks orientated towards extension 2 whereas the opposite row of bristles 7 has its hooks orientated towards end 3. It will, moreover, be seen from FIG. 1 that the leg of end bristle 6 is axially displaced in relation to the legs of corresponding bristles 7. Thus, the bristles 6 of the various rows are distributed along a multiplicity of geometrically parallel circles interspaced at a distance of 1.5 mm; each such circle corresponding to the legs of four bristles 6 (on four different generatrices of the support 1). The legs of bristles 7 are slightly offset so that the corresponding circles,which each comprise four legs 7, are slightly separated from the corresponding circles of the legs of bristles 6 by a distance approximating to the axial width of a bristle hook.

It will moreover be seen, again from FIG. 1, that it may nevertheless be considered that between two adjacent circular bristle sets, each comprising four bristles 6 and four bristles 7, for instance the set comprising bristles 6a and bristles 7a arranged in the immediate vicinity of end 3 and the set of bristles 6b and 7b immediately situated to the right on FIG. 1, there exists a bristle-free annular shaped passage allowing the insertion of an eyelash between two consecutive bristles 6 or two consecutive bristles 7. The eyelash will then be guided into this passage and covered by the make-up product carried by the various bristles 6 and 7 concerned.

It will, moreover, be understood that the various hooks of bristles 6 and 7 form reservoirs wherein the make-up product accumulates by capillarity which allows a certain constancy to be obtained in the quantity of the product disposed on the brush and hence facilitates the homogeneity of the covering. Moreover, the eyelashes which are impregnated with the material when they pass near bristles 6 or 7, are wiped as they rub against the surface of support 1 or the legs of bristles 6, 7.

Of course, the dimensions of the support, as well as the dimensions and the arrangement of the bristles, mentioned above have only been given by way of example and may vary widely.

Figure 4:
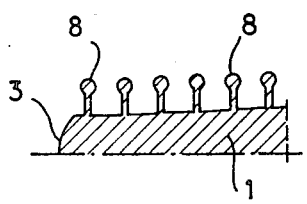
FIGS. 4 to 7 are details showing various bristle shapes.

Referring to FIG. 4, there has been shown schematically the reduced diameter end 3 of a support 1 covered by bristles having a different shape. In the case in point the bristles shown in FIG. 4 have a rectilinear shape, ending in a rounded end 8 in the shape of a sphere or part of a sphere. This shape also ensures a rather good retention of the product whilst eliminating all risk of injury or grazing.

Figure 5:
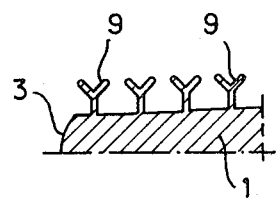

FIG. 5 shows bristles having a Y-shaped bifid end 9.

Figure 6:
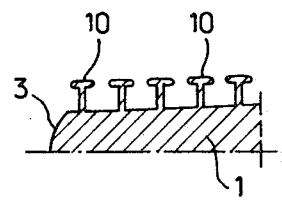

FIG. 6 shows bristles having free ends 10 giving a T shaped configuration to the bristles.

Figure 7:
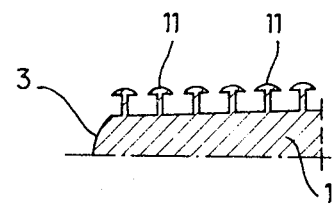

FIG. 7 shows bristles whose ends 11 have the shape of a nail head, mushroom or umbrella.

Figure 8:
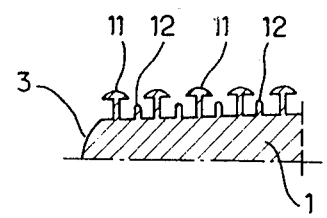
FIG. 8 is a detail showing sets of bristles having various shapes arranged alternately.

Finally, in FIG. 8, there has been shown a variant wherein the bristles 11 having an end, such as the mushroom end of FIG. 7, alternate in the same row, with rectilinear bristles 12 which are shorter. The function of the shorter intermediate bristles 12 is mainly to ensure a perfect separation of the various individual lashes, the positioning of the make-up product being mainly effected by the longer bristles 11.

Generally speaking, it will be understood that the invention thus allows bristles of various lengths and shapes, intended to ensure various and complementary functions, to be grouped alternately on a support.

Figure 9:
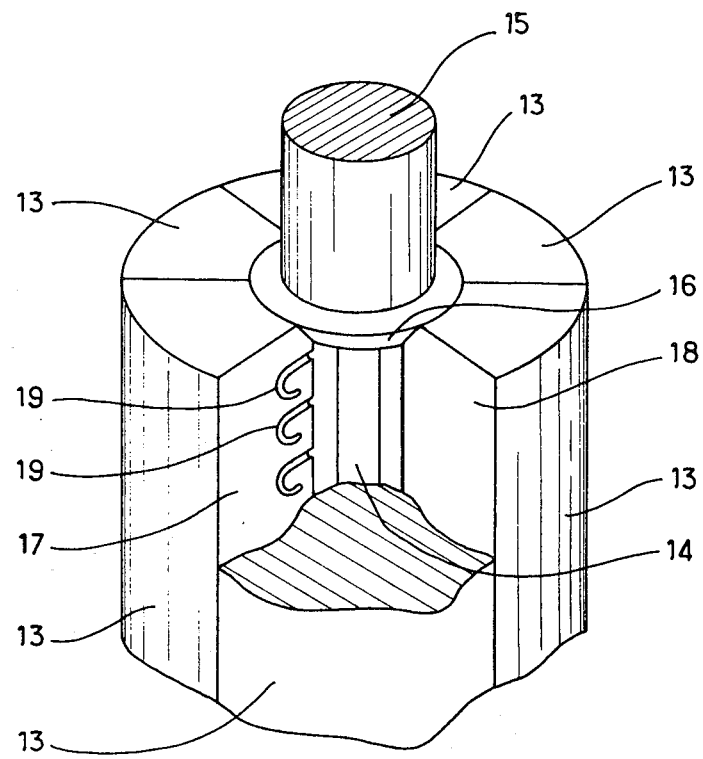
FIG. 9 is a diagrammatic, partly cut away view of an injection mould for making the brush according to the invention.

Reference will now be made to FIG. 9.

The part of the eyelash brush represented in FIGS. 1 to 3 may be advantageously obtained by means of injection moulding in a device such as that shown in FIG. 9. This device comprises a mould mainly formed by a multiplicity of mould segments 13. For the ease of the drawing, the mould has been shown formed by six segments but to make the brush support 1 shown in FIG. 1, a mould with eight segments would obviously be required to mould the four rows of bristles 6 and the alternate four rows of bristles 7.

When they are assembled the various mould segments 13 define between them a frustoconical cavity forming the mould, this cavity having exactly the shape of the component to be injection moulded. It will be seen that the top end of the mould 14 is obturated by a plug 15 having a frustoconical shape 16 to seat in a chamfer presented by the opposite surfaces of the mould segments 13. It will be understood that the surface (not shown) of plug 15 which is surrounded by zone 16 and is intended to form the domed end 3, has a corresponding concave shape.

At the other end (not shown) of the mould, provision may be made for a similar closing plug in order to obturate the end of the part of the mould intended to form the extension 2.

Each mould segment 13 has two radial sides 17, 18, such that the side 17 of a mould segment 13 will, when the mould is assembled, be in close contact with the adjacent side 18 of the adjacent mould segment.

It will, moreover, be seen that in the radial side 17 of each mould segment 13, there have been cut the bristle defining recesses 19 opening into the central mould cavity 14, these recess parts 19 having exactly the shape allowing formation of a bristle 6 or 7, as the case may be. When the mould is in its assembled state, the surface of side 18 of one mould segment which is adjacent to side 17 of the contiguous mould segment 13 covers all the parts of the bristle recess 19 of this side 17 and this explains why part 5 of the cross section of the bristles shown in FIG. 3 is planar.

The mould having been thus assembled, the required thermo-plastic composition, for instance an elastomer of the required hardness, is injected and the mould is kept closed until solidification. To effect the stripping, all the mould segments 13 are radially separated from each other. A gap is then very rapidly formed between two adjacent segment sides 17 and 18 and the elasticity of the bristle allows it to emerge from the recess 19 thanks to a very slight deformation.

Thus the method of the invention makes it possible to produce in a very simple way by injection moulding supports provided with integral bristles along complex conformations.

In fact, it will be understood that the recesses 19 could also easily be formed as T-shaped (for T-shaped bristles as in FIG. 6) or as any other shape to form bristle ends in the shape of balls or Ys, or of mushroom or umbrella shapes.

Moreover, the same mould shown in FIG. 9 may also be used to make brushes having only rectilinear bristles with a constant cross section. It is sufficient to regulate the injection pressure to such a value that the material cannot pass round into the curved ends of the impression recesses 19.

Although the invention has been described with reference to a few exemplary embodiments, it shall be duly understood that it is in no way restricted thereto and that various modifications of shape or of material may be made thereto without thereby departing from its scope as defined by the following claims.

I claim:

1. A mascara brush for brushing eyelashes with mascara comprising a support means and a plurality of individual bristles fixed to and extending outwardly from said support means, said bristles being integrally injection molded with said support means and being distributed along regular circular sets forming between them free annular-shaped passages to receive an eyelash so as to obtain a separation of the individual eyelashes to be brushed by means of said bristles, said bristles being disposed on said support means in rows regularly distributed around said support means with at least some of said rows having ends which are bent toward one end of said support means in the form of hooks and with the bristles of at least another row having ends bent in the form of hooks towards the opposite end of said support means, the bristles of adjacent rows being offset with respect to each other along said support means so that said hooks thereof are aligned to define a passage.

* * * * *